(12) United States Patent
Hawkes et al.

(10) Patent No.: US 7,305,084 B2
(45) Date of Patent: Dec. 4, 2007

(54) FAST ENCRYPTION AND AUTHENTICATION FOR DATA PROCESSING SYSTEMS

(75) Inventors: Philip Michael Hawkes, Burwood (AU); Gregory G. Rose, Concord (AU)

(73) Assignee: QUALCOMM Incorporated, San Diego, CA (US)

( * ) Notice: Subject to any disclaimer, the term of this patent is extended or adjusted under 35 U.S.C. 154(b) by 819 days.

(21) Appl. No.: 10/205,430

(22) Filed: Jul. 24, 2002

(65) Prior Publication Data

US 2004/0019783 A1    Jan. 29, 2004

(51) Int. Cl.
*H04L 9/00* (2006.01)
(52) U.S. Cl. .............................. 380/37; 380/28; 380/30; 380/42; 380/43; 380/277; 713/150; 713/168; 713/171
(58) Field of Classification Search ................. 380/28, 380/30, 37, 42, 43, 277; 713/150, 151, 168, 713/171
See application file for complete search history.

(56) References Cited

U.S. PATENT DOCUMENTS

| 4,918,728 | A  | * | 4/1990  | Matyas et al. | ............... | 380/280 |
| 6,950,517 | B2 | * | 9/2005  | Hawkes et al. | ............... | 380/37  |
| 2001/0046292 | A1 | * | 11/2001 | Gligor et al. | ................. | 380/37 |
| 2002/0071552 | A1 | * | 6/2002  | Rogaway | ..................... | 380/37 |

OTHER PUBLICATIONS

P. Rogaway et al., OCB : A Block-Cipher Mode of Operation for Efficient Authenticated Encryption, Department of Computer Science, University of California at Davis, california,USA, Aug. 3, 2001.*
V. Gligor et al., On Message Integrity in Symetric Encryption, Nov. 10, 2000, VDG Inc., Chevy Chase Maryland, Nov. 10, 2000.*
C. Jutla. Encryption Modes with almost free message integrity,. Advances in Cryptology-EUROCRYPT 2001. Lecture Notes in Computer Science, vol. 2045, B. Pfitzmann, ed., Springer- Verlag, 2001.*

* cited by examiner

*Primary Examiner*—Taghi Arani
(74) *Attorney, Agent, or Firm*—Thomas R. Rouse; Charles D. Brown; Won Tae C. Kim (57) ABSTRACT

Methods and apparatus are presented for secure, authenticated communication and data storage. The methods can be based on other methods such as IAPM, in which the encryption and authentication keys are of the same strength. In the HR-IAPM mode, a sender encrypts the data as in the IAPM mode using two encryption keys $K_0$ and $K_1$. The sender then XORs the plaintexts with corresponding ciphertexts, and combines the results to form a checksum This checksum is encrypted under the authentication key $K_2$, this value is appended to the encrypted message as a message authentication code (MAC). The receiver decrypts as with IAPM, XORs the plaintexts with the corresponding ciphertexts and combines these values to form a checksum. The receiver then encrypts the checksum under the authentication key $K_2$ and verifies that the resulting value agrees with the MAC. The HR mode allows blocks to be sent un-encrypted if desired.

42 Claims, 7 Drawing Sheets

FAST ENCRYPTION AND AUTHENTICATION FOR DATA PROCESSING SYSTEMS

CROSS REFERENCE

This application is related to U.S. Pat. No. 7,254,233, issued on Aug. 7, 2007, entitled "Fast Encryption and Authentication for Data Processing Systems"; and U.S. Pat. No. 6,950,517, issued on Sep. 27, 2005, entitled "Efficient Encryption and Authentication for Data Processing Systems," and U.S. Pat. No. 6,948,067, issued on Sep. 20, 2005, entitled "Efficient Encryption and Authentication for Data Processing Systems."

BACKGROUND

1. Field

The present invention relates to the field of data processing systems. In particular, to improving security in data processing systems.

2. Background

In a number of diverse fields, such as, e.g., electronic commerce, communications, and broadcasting, security is a major concern. Security measures contribute to accountability, fairness, accuracy, confidentiality, operability, and other criteria that are desired of data processing systems and information systems utilized in these fields. Cryptographic methods that provide such security are usually categorized according to two purposes: encryption and authentication. Encryption is the art of rendering data unreadable by unauthorized parties. Authentication is used to verify the integrity of the data. Verifying the integrity of the data involves verifying the author identity of the data and/or verifying whether the data has been altered.

Encryption systems are often referred to as cryptosystems, and have the property of being either symmetric or asymmetric. A symmetric encryption system uses a secret key to encrypt information and the same secret key to decrypt the encrypted information. An asymmetric encryption system, such as a public key cryptosystem, uses a first key to encrypt information and uses a different key to decrypt the encrypted information.

In many symmetric cryptosystems, one key is used for the encryption and a separate key is used for the authentication. Hence, in data processing systems using a symmetric cryptosystem, encryption and authentication are performed as two separate entities. Since authentication requires approximately as much processing power as encryption, the total amount of processing is equivalent to encrypting the data twice. In data processing systems that operate in a power-limited or hardware-limited environment, such as, e.g., a cellular telephone, personal digital assistant, or other portable communication device, it would be desirable to have a cryptosystem that can perform encryption and authentication as a single entity in order to reduce the computational load upon the device or to increase the speed at which the device performs the encryption and authentication.

In the papers "Parallelizable Encryption Mode with Almost Free Message Integrity" by Charanjit Jutla and "OCB: A Block-Cipher Mode of Operation for Efficient Authenticated Encryption" by P. Rogaway, cryptosystems were presented that can encrypt messages and authenticate the encrypted messages in a manner that requires little more processing than encryption alone. In other words, encryption and authentication can be performed efficiently as a single functional entity. Hence, the amount of processing resources required to provide security is reduced.

Both cryptosystems require the encryption of all the data that is to be transmitted. However, the requirement that all data of a message must be encrypted is undesirable in certain applications. For example, in communication protocols such as IPSec, encryption of all data is not efficient. A header portion of the data must be sent unencrypted for addressing purposes. The foundations of IPSec are specified in RFC 1825 entitled "Security Architecture for the Internet Protocol," RFC 1826 entitled "IP Authentication Header," and RFC 1827 entitled "IP Encapsulating Security Payload (ESP)," all of which were submitted by R. Atkinson in August, 1995.

Hence, there is a present need for a secure and efficient system for encryption and authentication of data wherein all data bits of a message need not be encrypted.

SUMMARY

Methods and apparatus are presented herein to address the need stated above. Specifically, methods and apparatus are presented for allowing some portion of the data message to be transmitted as plaintext, some portion of the data message to be transmitted as ciphertext, and using a single authentication tag for verifying both the plaintext portion and the ciphertext portion of the data message.

In one aspect, a method is presented for encrypting and authenticating data as a single entity, the method comprising: arranging data into a plurality of plaintext blocks, determining a plurality of noise blocks using a nonce value and a first key; determining a plurality of ciphertext blocks by combining each of the plurality of plaintext blocks with a corresponding noise block to form an intermediate plaintext block, encrypting the intermediate plaintext block to form an intermediate ciphertext block, and combining the intermediate ciphertext block with the corresponding noise block to form a plurality of ciphertext blocks; computing an input checksum value by combining the plurality of plaintext blocks that are not specified by at least one cleartext position and a noise block; computing an output checksum value by combining the plurality of ciphertext blocks that are specified by the at least one cleartext position and another noise block; computing an authentication tag by encrypting the input checksum value and combining the encrypted input checksum value with the output checksum value; replacing each of the plurality of ciphertext blocks that is specified by the at least one cleartext position with a corresponding plaintext block; and appending the authentication tag.

In another aspect, a method is presented for decrypting and verifying a plurality of received transmission blocks accompanied by an authentication tag, comprising: determining a plurality of noise blocks using a nonce value; for each of the plurality of received transmission blocks not specified by a cleartext position, determining a first plurality of plaintext blocks using a decryption mode; for each of the plurality of received transmission blocks specified by a cleartext position, determining a plurality of secondary ciphertext blocks using an encryption mode; determining a second plurality of plaintext blocks by setting each of the second plurality of plaintext blocks equal to a corresponding one of the plurality of received transmission blocks specified by a cleartext position; computing an input checksum value based on the first plurality of plaintext blocks and the last noise block; computing an output checksum value based on the plurality of second ciphertext blocks and the first noise block; and verifying the authentication tag using the input checksum value and the output checksum value.

In another aspect, a method is presented for secure data transmissions, wherein a first portion of the data transmission is sent as plaintext, a second portion of the data transmission is sent as ciphertext, and all of the data transmission is authenticated, the method comprising: encrypting the first portion of the data transmission a first ciphertext portion and the second portion of the data transmission into a second ciphertext portion, wherein the first portion of the data transmission is specified by a set of cleartext positions and the second portion of the data transmission is not associated with any one of the set of cleartext positions; generating an input checksum value using the second portion of the data transmission and a noise block; generating an output checksum value using the second ciphertext portion and another noise block; forming an authentication tag from the input checksum value and the output checksum value; and transmitting the first portion of the data transmission, the second ciphertext portion, and the authentication tag.

In another aspect, apparatus is presented for secure data transmissions, wherein a first portion of the data transmission is sent as plaintext, a second portion of the data transmission is sent as ciphertext, and all of the data transmission is authenticated, the apparatus comprising: means for encrypting the first portion of the data transmission a first ciphertext portion and the second portion of the data transmission into a second ciphertext portion, wherein the first portion of the data transmission is specified by a set of cleartext positions and the second portion of the data transmission is not associated with any one of the set of cleartext positions; means for generating an input checksum value using the second portion of the data transmission and a noise block; means for generating an output checksum value using the second ciphertext portion and another noise block; means for forming an authentication tag from the input checksum value and the output checksum value; and means for selecting the first portion of the data transmission, the second ciphertext portion, and the authentication tag for transmission.

DETAILED DESCRIPTION

Figure 1A:
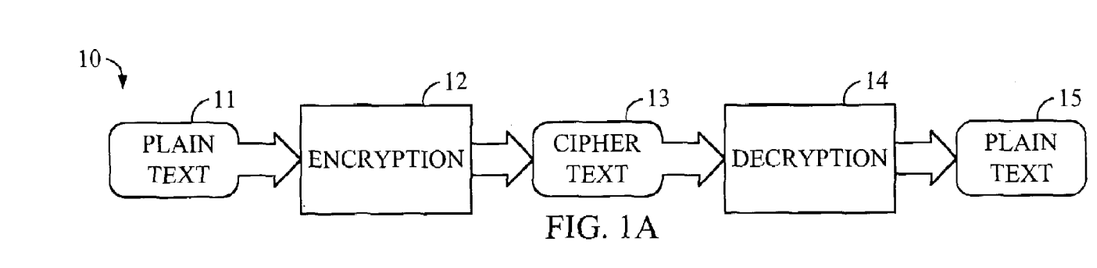
FIGS. 1A, 1B, and 1C are block diagrams of a basic cryptosystem, a symmetric encryption system and an asymmetric encryption system.

Encryption renders data unreadable by unauthorized parties. The original data message is referred to as a plaintext message or plaintext. The encrypted message is called a ciphertext, wherein encryption includes any means to convert plaintext into ciphertext e.g., block ciphers, hash functions, or any other cryptographic function. Decryption includes any means to convert ciphertext into plaintext, i.e., to recover the original message. FIG. 1A illustrates a basic cryptosystem 10 designed for encryption. The plaintext message 11 is operated upon by an encryption scheme 12 to form ciphertext 13. The ciphertext 13 is then transmitted through a communication channel (not shown) and undergoes a decryption scheme 14 at another site (not shown) to recover the plaintext 15. Plaintext and ciphertext can refer to any data, including audio and video data presented in digital form.

Cryptanalysis is the art of circumventing the security of cryptosystems. The entity performing the cryptanalysis is known in the art as an adversary or attacker. A cryptanalysis of an encryption scheme is directed towards decrypting an unauthorized message. A cryptanalysis of an authentication scheme is directed towards the composition of a message that can be verified as being sent by someone else.

A cryptosystem is based on secrets. A group of entities shares a secret if an entity outside this group cannot obtain the secret without expending a significantly large amount of resources. This secret is said to serve as a security association within the group of entities.

Figure 1B:
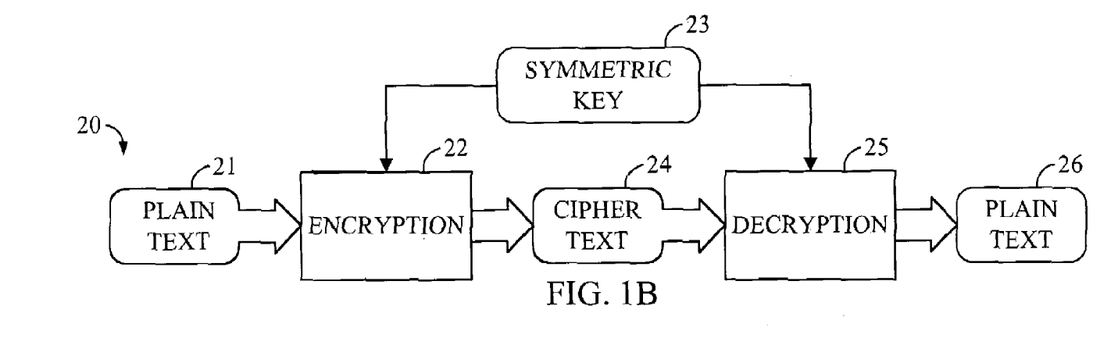

Typically, the secret comprises a key or a set of keys, which are measured in bits. The longer the key, the more cryptically secure the key will be. A symmetric cryptosystem uses the same secret key to encrypt a message as to decrypt a message. A symmetric encryption system 20 is illustrated in FIG. 1B, wherein both the encryption and decryption utilize a same private key. Plaintext 21 is operated upon by an encryption scheme 22. A secret key 23 is used in the encryption scheme 22 to form ciphertext 24. Cipher text 24 is transmitted over a communication channel (not shown) to another site wherein a decryption scheme 25 uses the same secret key 23 to form the plaintext 26.

Figure 1C:
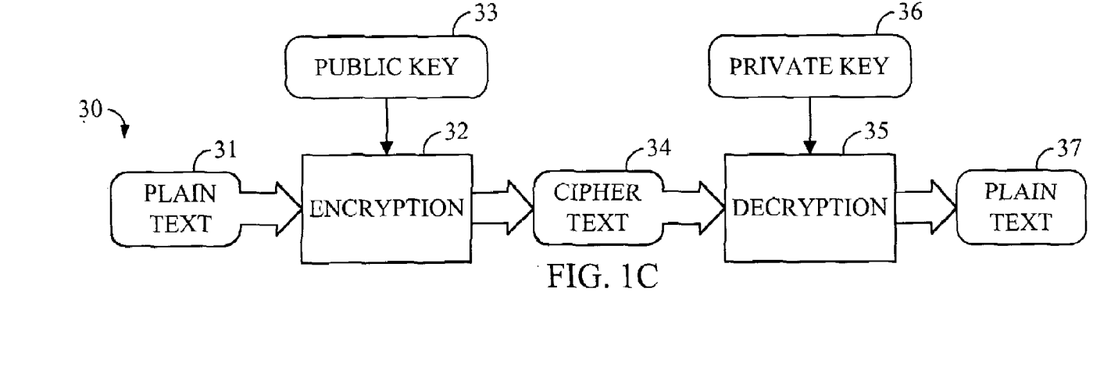

In contrast, an asymmetric cryptosystem uses a first key to encrypt a message and uses a different key to decrypt it. FIG. 1C illustrates an asymmetric encryption system known as a public key cryptosystem 30, wherein a public key is provided for encryption and a private key is provided for decryption. The public key is published, so that any party can use the public key to encrypt any message. However, only the privately held, unpublished key may be used to decrypt the message encrypted with the public key. Plaintext 31 is input into an encryption scheme 32, which uses a public key 33 that is associated with a designated party and obtained from a publication. The resulting ciphertext 34 is transmitted over a communication channel (not shown) to the designated party. The designated party uses a private key 36 in a decryption scheme 35 to convert the ciphertext 34 into plaintext 37.

Symmetric encryption is generally much faster than asymmetric encryption. However, transfer of the secret key from a sender to a recipient is problematic due to the possibility of interception by an adversary. One solution is to use a trusted third party to hold the keys, who will share a key only with an authorized party. The embodiments described herein do not address this problem, and assumes that the sender and receiver share a secret key.

The integrity of the ciphertext generated by the above cryptosystems is typically provided by appending some authenticating data to the transmitted ciphertext. The authenticating data is usually computed as a function of the message content and a secret integrity key.

In a symmetric authentication system, the authenticating data is known as a Message Authentication Code (MAC).

The MAC is computed as a function of both the message content and a secret integrity key, wherein both the sender and the designated target share the secret integrity key. The sender transmits the message and appends the MAC. The message can be either plaintext or ciphertext. The receiver re-computes the MAC from the message and accepts the integrity of the message only if the re-computed MAC agrees with the transmitted MAC. Theoretically, only the sender of the message could generate a valid signature for that message, thereby authenticating the message for the receiver.

Figure 2A:
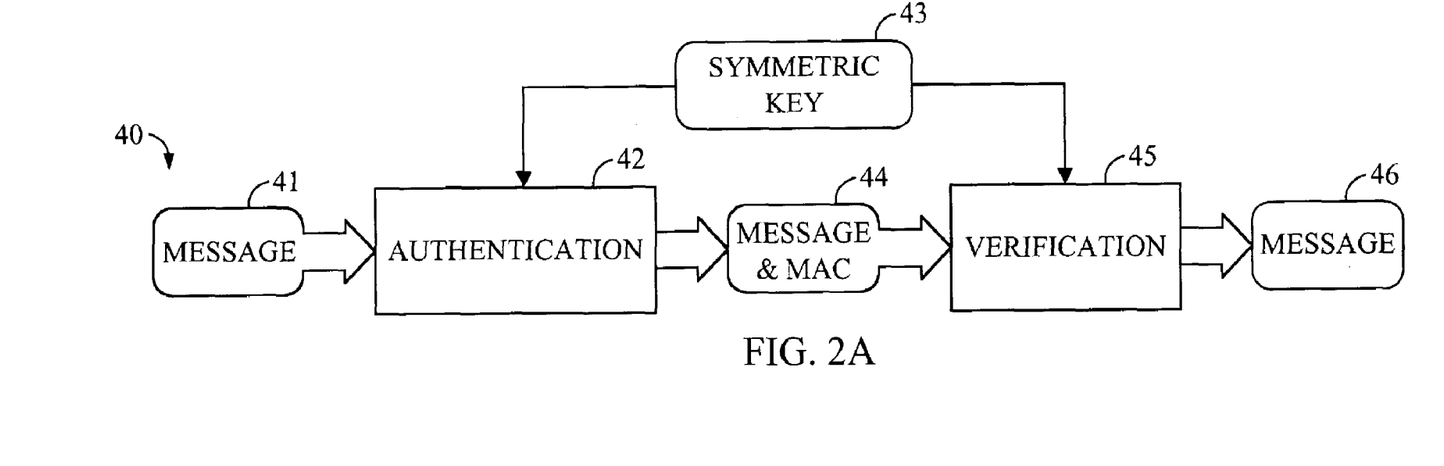
FIGS. 2A and 2B are block diagrams of a symmetric authentication system and an asymmetric authentication system.

A symmetric authentication system 40 is illustrated in FIG. 2A, wherein both the signing and verification utilize a same private key. The message 41 is operated upon by an authentication scheme 42 that uses a key 43 to form authenticating data 44. The authenticating data 44 and the message 41 are then transmitted through a communication channel (not shown) to another party (not shown). The message 41 is operated upon an verification scheme 45 using a same key 43 to determine authenticating data 46. The authenticating data 46 that is generated by the receiving party is compared to the authenticating data 44 that is received over the communication channel.

Figure 2B:
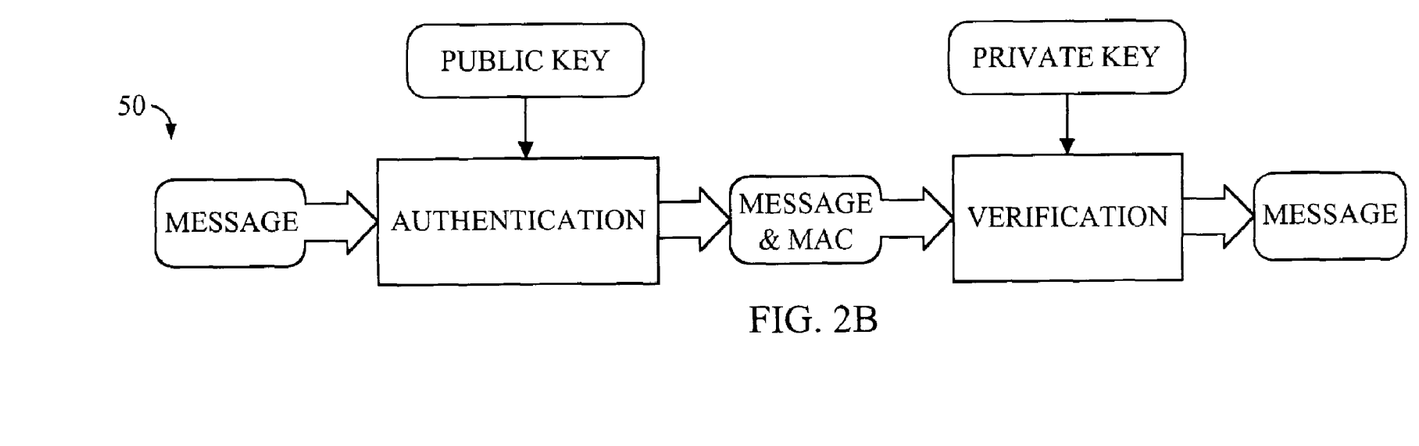

In an asymmetric authentication system, the authenticating data is known as a digital signature. The digital signature is computed as a function of the message content and a private integrity key of the sender. The sender transmits the digital signature to a receiving party, who then performs a verification upon the digital signature using a public key of the sender. An asymmetric authentication system 50 is illustrated in FIG. 2B, wherein the signing utilizes a private key and the verification utilizes the corresponding public key.

In some schemes, the MAC or digital signature is computed from a 'message digest' that contains a unique mathematical description of a secret message. The message digest is smaller in length than the original message, so that computations upon the message digest are more easily performed. Dependence of the MAC or digital signature upon a secret message or upon a message digest ensures that the authenticating data does not remain constant, since the secret message or message digest does not remain constant. If the authenticating data does remain constant across multiple messages, then an adversary could easily appropriate the authenticating data falsely.

The message digest is often computed using a cryptographic hash function. A cryptographic hash function computes a value (comprising a fixed number of bits) from any input, regardless of the length of the input. One property of a cryptographic hash function is that given an output value, it is computationally difficult to determine an input that will result in that output. An example of a cryptographic hash function is SHA-1, as described in "Secure Hash Standard," FIPS PUB 180-1, promulgated by the Federal Information Processing Standards Publications (FIPS PUBS) and issued by the National Institute of Standards and Technology (NIST).

A block cipher is a symmetric encryption scheme for which the input to the scheme is always a fixed length in bits. The length is known as the block size of the block cipher. An example of a block cipher is the Data Encryption Standard (DES) as described in "Data Encryption Standard", FIPS PUB 46-1 promulgated by the FIPS PUBS and issued by the NIST. DES has a block size of 64-bits. Another example of a block cipher is the Advanced Encryption Standard (AES) as described in "Advanced Encryption Standard", FIPS PUB 197 promulgated by the FIPS PUBS and issued by the NIST. AES has a block size of 128-bits.

The key length of a block cipher is the length of the key in bits. However, the entropy of a key is the logarithm (base 2) of the number of possible values for the key. The entropy is also written in terms of bits. For example, the DES has a 64-bit key, with 8 of these bits used as checksums to detect errors in key transmission. Consequently, the key-entropy of DES is (64−8)=56 bits.

Given several pairs of inputs and corresponding outputs of a block cipher, the block cipher key can be derived by an adversary who tests all possible key values in order to determine which inputs result in the correct outputs. This type of attack is known as an exhaustive key search. The computational complexity of this attack is the number of encryption operations required for the attack. Hence, an attack for extracting a k-bit key requires approximately $2^k$ encryption operations to extract the block cipher key in an exhaustive key search.

Block ciphers are useful for constructing other cryptographic entities. The way in which a block cipher is used is called a mode of operation. Four modes of operation for DES have been standardized and are described in "DES Modes of Operation", FIPS PUB 81, promulgated by the FIPS PUBS and issued by the NIST. These four modes are Electronic Codebook (EBC), Cipher Bock Chaining (CBC), Output Feedback (OFB) and Cipher Feedback (CFB). For illustrative purposes, only ECB and CBC are discussed herein to encrypt a sequence of plaintext blocks $P_1, \ldots,$ and $P_m$.

In ECB mode, the block cipher is used to encrypt each block of plaintext into a block of ciphertext according to the following relation:

$$C_i = E_K(P_i),$$

where $E_K(P_i)$ denotes the encryption of the block $P_i$ using the key K. Another expression "$D_K(P_i)$" is used herein to denote the decryption of the block $P_i$ using the key K.

In CBC mode, the first plaintext block is XORed with a secret initial value (IV) to form a result that is then encrypted. A mathematical description of this process is written in accordance with the relation:

$$C_1 = E_K(P_1 \oplus IV).$$

Thereafter, each plaintext block is XORed with the previous ciphertext prior to encryption as follows:

$$C_i = E_K(P_i \oplus C_{i-1}).$$

Efficient encryption and authentication can be problematic in symmetric cryptosystems. Until recently, the only solution to satisfy this requirement was to use a naïve approach: provide encryption and authentication as two separate functions. The two functions require approximately equal amounts of computation, so using both functions is twice as expensive as using only one or the other.

Figure 3:
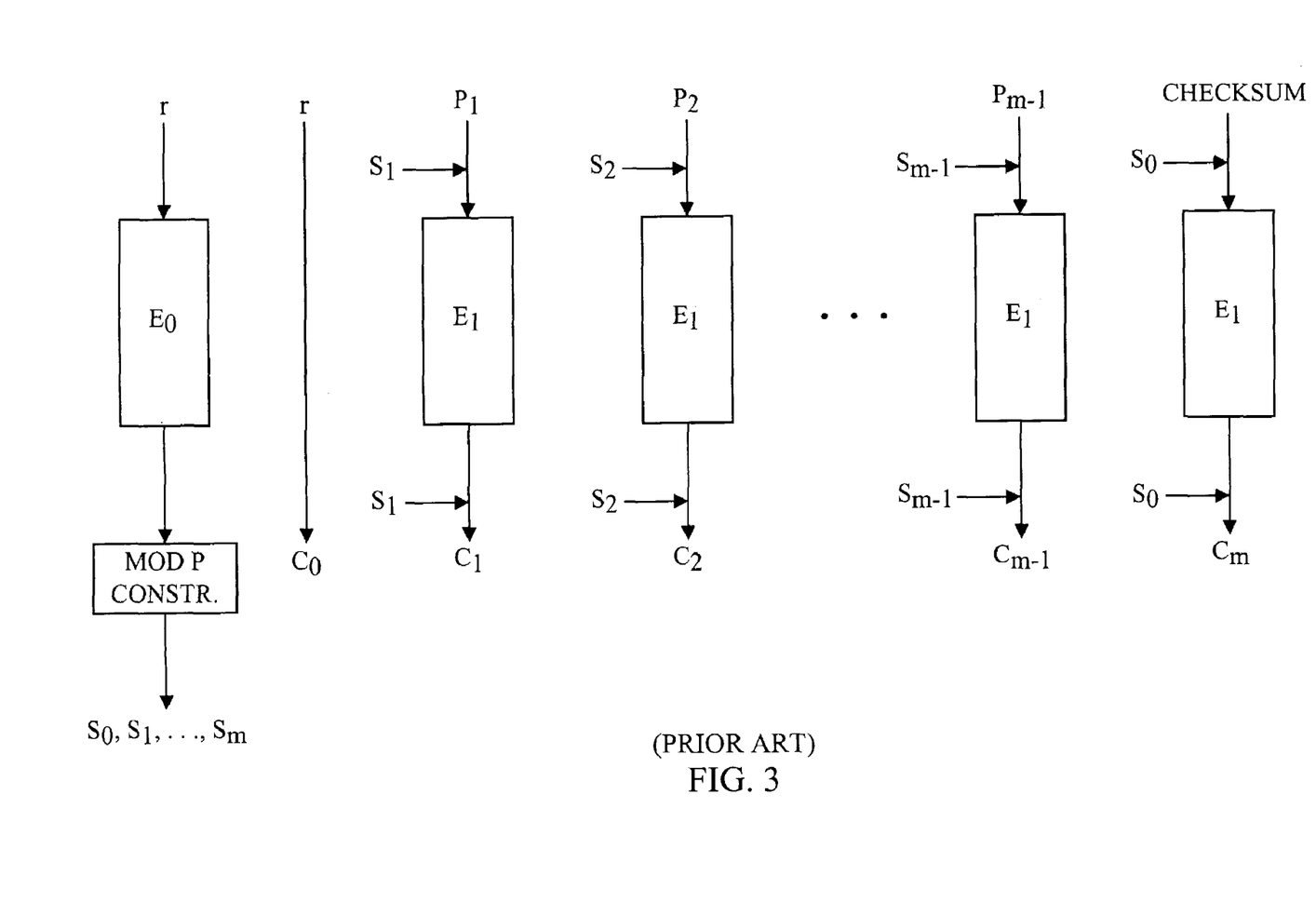
FIG. 3 is a block diagram of the Integrity Aware Parallelizable Mode (IAPM).

In the papers, "Parallelizable Encryption Mode with Almost Free Message Integrity" and "Encryption Modes with Almost Free Message Integrity," Jutla proposed two methods that provide encryption and authentication requiring only slightly more computations than either encryption or authentication alone. These methods are of a general form and employ a block cipher as a cryptographic kernel. In the cryptographic community, such a method is also called a "mode of operation." One of Jutla's mode of operations, known as Integrity Aware Parallelizable Mode (IAPM) with only XOR operations, is shown in FIG. 3. IAPM uses two keys: $K_0$ and $K_1$. Suppose a sender wishes to encrypt and authenticate a message consisting of (m-1) message blocks $P_1$ through to $P_{m-1}$. The sender chooses a random value r that is placed in ciphertext block $C_0$. The value of r is encrypted to form value a using the key $K_0$. The value a is then used to derive pair-wise independent values $S_0$ through to $S_m$. $S_0, \ldots, S_m$ are pair-wise independent if $S_0, \ldots, S_m$ are uniformly distributed n-bit random numbers with the property that for every pair $S_i$ and $S_j$, where $i \neq j$, and every pair of n bit constants $c_1$ and $c_2$, the probability that $S_i = c_1$ and $S_j = c_2$ is $2^{-2n}$. The actual computation of $S_0$ through to $S_m$ is not relevant to the understanding of IAPM and will not be described herein. Hereinafter, these pair-wise independent values will be referred to as "noise blocks." The values of the ciphertext blocks $C_1$ through to $C_{m-1}$, are derived as:

$C_1 = E_{K1}(P_1 \oplus S_1) \oplus S_1$, $C_2 = E_{K1}(P_2 \oplus S_2) \oplus S_2$, $C_{m-1} = E_{K1}(P_{m-1} \oplus S_{m-1}) \oplus S_{m-1}$, wherein the key $K_1$ is used for each ciphertext block. The sender then computes a checksum value CHK, which is defined by:

$CHK = P_1 \oplus P_2 \oplus \ldots \oplus P_{m-1} S_m$.

A MAC tag $C_m$ is computed from CHK by encrypting with key $K_1$ and XORing $S_0$:

$C_m = E_{K1}(CHK) \oplus S_0$.

The sender transmits $C_0 \ldots C_m$.

Suppose a receiver receives $C'_0 \ldots C'_m$. The receiver begins the decryption process by first encrypting $r' = C'_0$ to form a', using the key $K_0$. The receiver then computes the values of $S'_0$ through to $S'_m$. The values of the plaintext blocks $P'_1$ through to $P'_{m-1}$, where $1 \leq i \leq m$, are derived as:

$P'_1 = D_{K1}(C'_1 \oplus S'_1) \oplus S'_1$, $P'_2 = D_{K1}(C'_2 \oplus S'_2) \oplus S'_2$, $P'_{m-1} = D_{K1}(C'_{m-1} \oplus S'_{m-1}) \oplus S'_{m-1}$, wherein the key $K_1$ is used for each plaintext block. The receiver then computes a checksum value CHK' defined by:

$CHK' = P'_1 \oplus P'_2 \oplus \ldots \oplus P'_{m-1} \oplus S'_m$.

A value X is computed by encrypting CHK' with key $K_1$, and then XORing the encrypted result with $S'_0$. Mathematically, the process can be described as follows:

$X = E_{K1}(CHK') \oplus S'_0$.

If X and $C'_m$ are equal, then the receiver can be sure of the integrity of the encrypted message.

Rogaway, in the paper, "OCB: A Block-Cipher Mode of Operation of Efficient Authenticated Encryption," proposed a similar mode called Offset Codebook mode (OCB mode) that provides encryption and authentication using a similar amount of computation. OCB is similar to IAPM when generating most of the ciphertext blocks, except for the last ciphertext block $C_{m-1}$. In particular, OCB allow the last plaintext block $P_{m-1}$, to have a length that is less than the block size of the block cipher, but OCB encrypts the last plaintext block into a ciphertext block that is the same size as the other ciphertext blocks. OCB differs from IAPM by the number of noise blocks needed and the method used to generate the noise blocks.

The above modes of operation have certain undesirable properties. The first undesirable property is that these modes require all of the data to be sent encrypted. In Internet protocols such as IPSec, it is not desirable to transmit messages where all the data is encrypted. In particular, headers containing addressing information must be sent in the clear. The embodiments described herein propose an alternative to the IAPM mode (hereafter referred to as the HR-IAPM mode) that allows blocks of the data to be sent as plaintext, while adding only a small amount of processing. The embodiments can be based on any of the modes of operation proposed by Jutla and Rogaway.

It should be noted that either hardware or software in data or communication systems could be configured to perform the different embodiments of the HR-IAPM mode. Hardware may include, but are not limited to, processing elements that implement a set of instructions stored on a computer-readable medium, e.g., memory, to perform the encryption, authentication, decryption, and verification processes that are described herein. Moveover, the various combination steps are described using the bit-wise, logical exclusive-or operator. Other implementations of the embodiments can be performed by using modular integer addition operations, wherein two inputs are treated as binary representations of integers, an intermediate value is formed as the binary representation as the sum of the integers, and the output is formed by truncating the intermediate value to the cipher block size. Other group operators can be also be used with the appropriate modifications, however, for the purpose of illustrative ease, only the embodiments using XOR operators are described herein.

Figure 4:
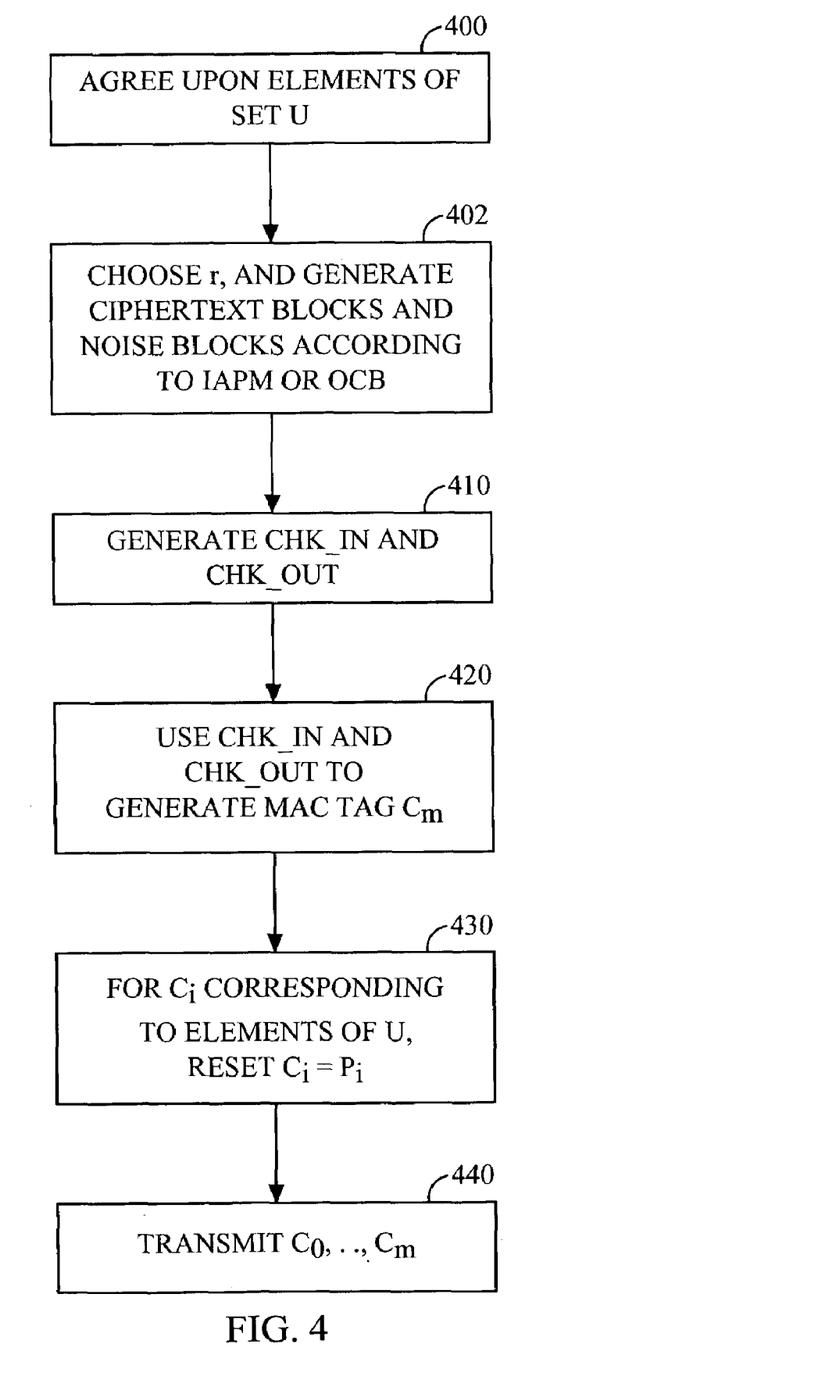
FIG. 4 is a block diagram of the Hawkes-Rose Integrity Aware Parallelizable Mode (HR-IAPM).

An embodiment of the HR-IAPM mode is illustrated in FIG. 4. The HR-IAPM mode of operation uses two keys: $K_0$ and $K_1$. Suppose a sender wishes to encrypt and authenticate a message consisting of (m-1) message blocks $P_1$ through to $P_{m-1}$.

At step 400, the sender and receiver agree on the set of plaintext blocks to be sent in unencrypted form. Let U denote the set of indices of the plaintext blocks to be sent in un-encrypted form, wherein the elements of U are referred to as cleartext positions.

At step 402, the sender chooses a nonce value r and follows the IAPM mode to compute the noise blocks $S_0$ through to $S_m$ and the ciphertext blocks $C_0$ through to $C_{m-1}$. In alternative embodiments, the nonce value r can be a value that is negotiated with a receiver or the nonce value can be predetermined.

At step 410, the sender then computes checksum values CHK_IN and CHK_OUT, which are defined by:

$CHK\_IN = (\oplus_{i \notin U} P_i) \oplus S_m$, and $CHK\_OUT = (\oplus_{i \in U} C_i) \oplus S_0$.

At step 420, the sender computes a MAC tag $C_m$ by encrypting CHK_IN with key $K_1$, and the XORing the result with CHK_OUT. This process is described mathematically as follows:

$C_m = E_{K1}(CHK\_IN) \oplus CHK\_OUT$.

At step 430, the sender re-sets those ciphertext blocks $C_i$ wherein $i \in U$, such that $C_i = P_i$.

At step 440, the sender transmits $C_0 \ldots C_m$.

Figure 5:
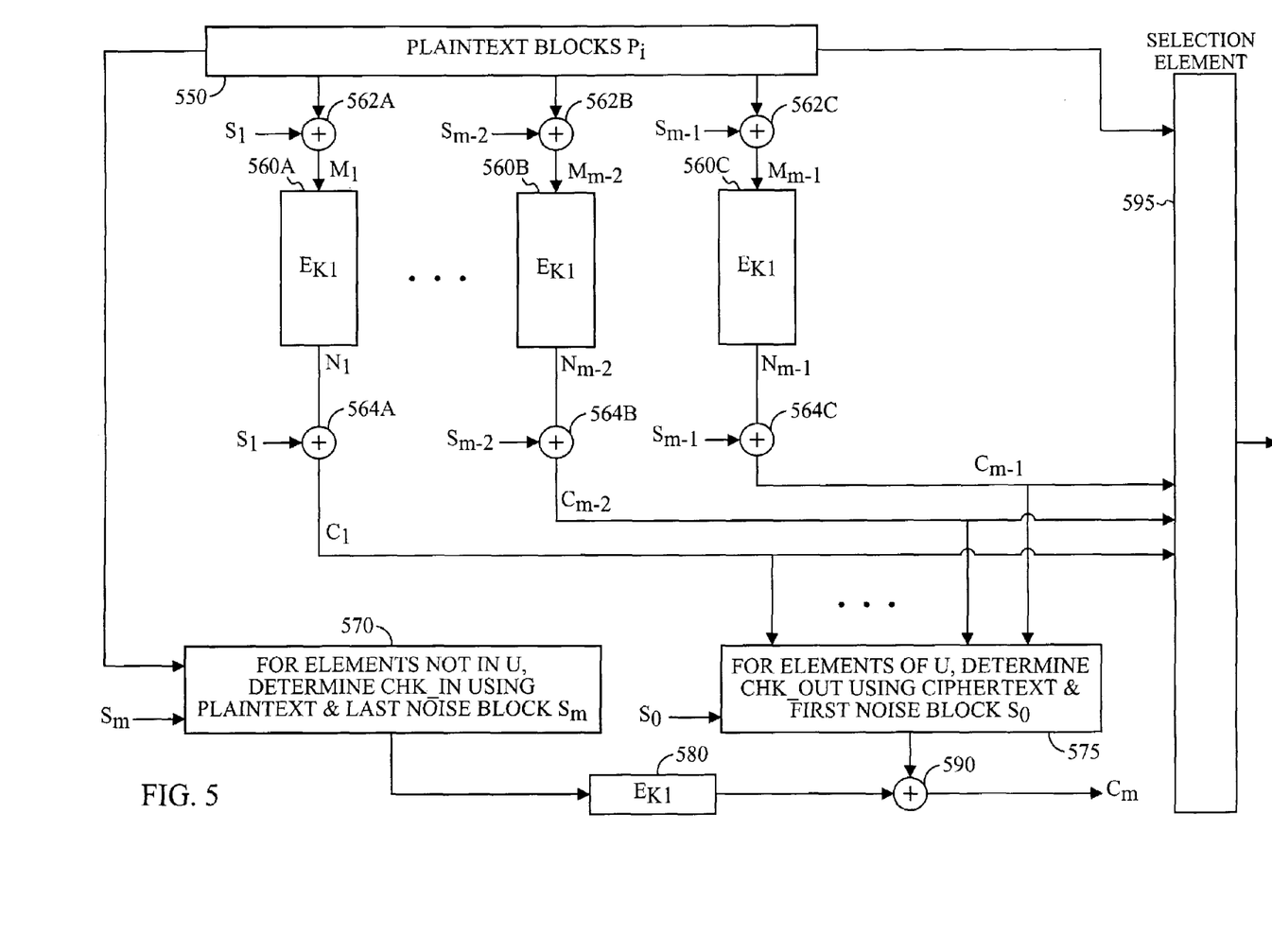
FIG. 5 is a block diagram of hardware configured to perform the encryption and authentication for HR-IAPM.

FIG. 5 is a block diagram of hardware that is configured to perform the above encryption and authentication of the HR-IAPM mode in a parallel manner. It should be noted that FIG. 5 illustrates an implementation that can be an alternative to a software implementation, wherein a processor and memory is configured to execute a set of instructions for performing the above HR-IAPM mode.

Memory element 550 stores plaintext blocks $P_i$, some of which are to be encrypted and all of which are to be authenticated. Encryption elements 560A, 560B, and 560C are configured to perform a cryptographic function upon inputs. For illustrative purposes only, three (3) encryption elements are shown in FIG. 5 for encrypting plaintext blocks, but one of skill in the art knows that more or less encryption elements can be implemented without affecting the scope of the embodiment.

In this embodiment, the inputs to the encryption elements 560A, 560B, and 560C are the nonce value r at the first encryption element 560A, and intermediate plaintext blocks $M_1$ through $M_{m-1}$, individually, at each respective remaining encryption element. The intermediate plaintext blocks $M_1$ through $M_{m-1}$ are the output of combining elements 562A, 562B, and 562C, which combines, individually, the plaintexts $P_1, \ldots P_{m-1}$ with corresponding noise blocks $S_1$ through $S_{m-1}$. In one aspect, the combining elements 562A, 562B, and 562C are XOR gates. In another aspect, the combining elements 562A, 562B, and 562C are group operators. The outputs of the encryption elements 560A, 560B, and 560C are intermediate ciphertext blocks $N_1$ through $N_{m-1}$. The intermediate ciphertext blocks $N_1$ through $N_{m-1}$ are combined with corresponding noise blocks $S_1$ through $S_{m-1}$ by combining elements 564A, 564B, and 564C. The outputs of the combining elements 564A, 564B, and 564C are ciphertext blocks $C_1$ through $C_{m-1}$.

Processing block (a.k.a. checksum generator) 570 is configured to determine a checksum value CHK_IN by using plaintext blocks that are to be transmitted in an encrypted form and the last noise block $S_m$. Processing block (a.k.a. checksum generator) 575 is configured to determine a checksum value CHK_OUT by using the first noise block $S_0$ and ciphertext blocks corresponding to plaintext blocks that are to be transmitted in the clear. Formulas for determining CHK_IN and CHK_OUT have been described above. CHK_IN is then input into an encryption element 580. The output of the encryption element 580 is then combined with CHK-OUT using a combining element 590. The output of the combining element 590 is the last ciphertext block $C_m$, which is also used as an authentication tag.

The ciphertext blocks $C_0$ through $C_{m-1}$, the authentication tag $C_m$, and the plaintext blocks $P_i$ are input into a selection element 595, which determines whether the blocks that are to be transmitted are either ciphertext or plaintext. In other words, those $P_i$ where $i \in U$ are transmitted, along with those $C_i$ for which $i \notin J$.

Figure 6:
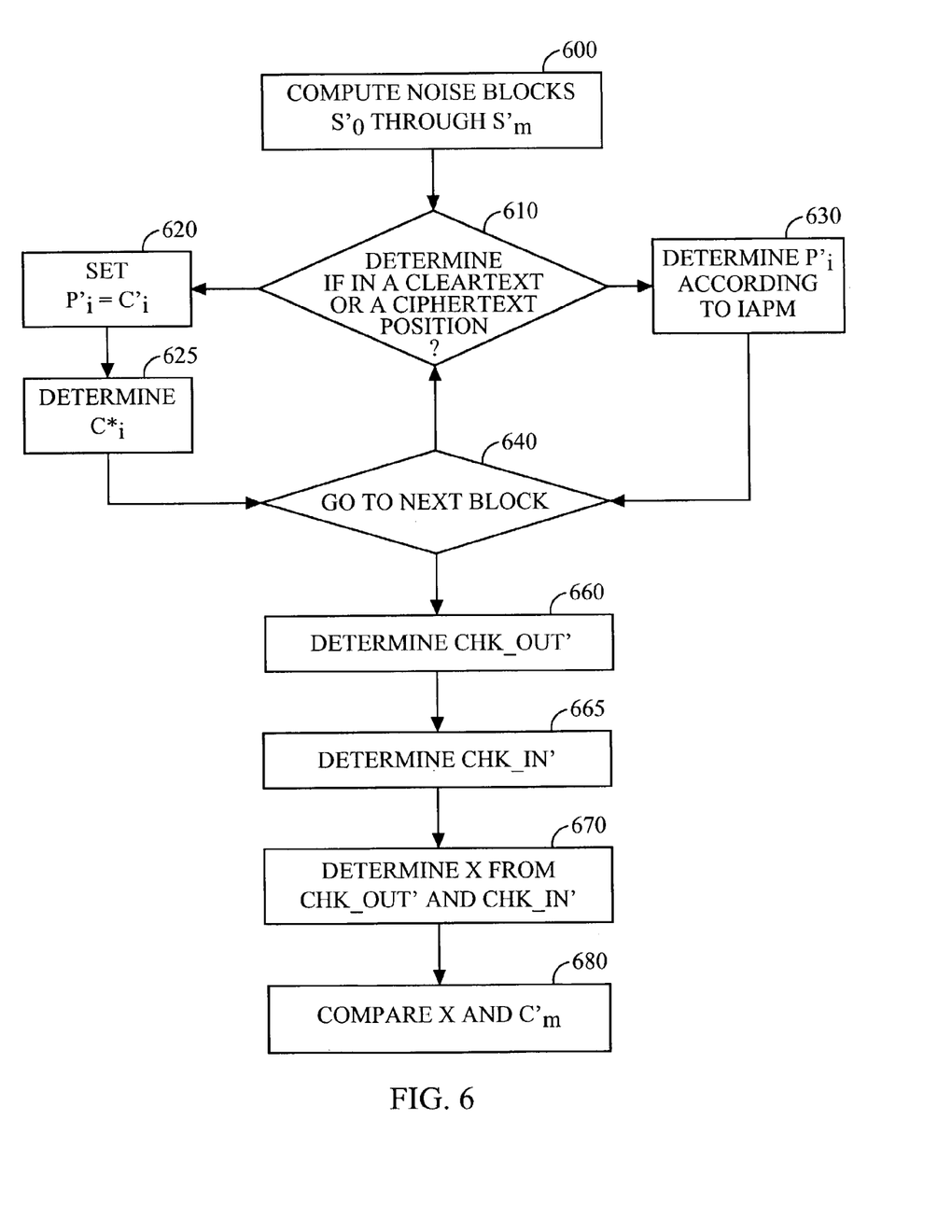
FIG. 6 is a block diagram of the decryption and verification for HR-IAPM.

FIG. 6 is a block diagram of the decryption and verification of a message that has been encrypted and authenticated by HR-IAPM. Suppose a receiver receives transmission blocks $C'_0 \ldots C'_m$. Note that for $i \in U$, $C'_i$ was transmitted unencrypted. At step 600, the receiver computes the values of $S'_0$ through to $S'_m$ using $C'_0$. At step 610, the receiver begins an iterative procedure to derive the plaintext block $P'_i$ from the received transmission blocks $C'_i$, wherein the receiver determines whether the received transmission blocks $C'_i$ are specified by a cleartext position or a ciphertext position. For $i \in U$, the program flow proceeds to step 620. For $i \notin J$, the program flow proceeds to step 630.

If $i \in U$, then at step 620, the receiver sets the plaintext blocks $P'_i = C'_i$.

At step 625, the receiver uses the plaintext blocks $P'_i$ obtain secondary ciphertext blocks $C^*_i$, according to the formula:

$$C^*_i = E_{K1}(P'_i \oplus S_i) \oplus S_i.$$

The program flow then proceeds to step 640. At step 640, the index i is incremented and a decision is made as to whether i<m. If the condition i<m is true, then the program flow goes back to step 610. If the condition i<m is not true, then the program flow proceeds to step 660.

If $i \notin J$, then at step 630, the receiver decrypts to obtain the plaintext blocks $P_i$, as in the IAPM mode. The program flow then proceeds to step 640.

At step 660, the receiver computes a checksum value CHK_OUT', which is defined by:

$$\text{CHK\_OUT'} = (\oplus_{i \notin J} C^*_i) \oplus S_0.$$

At step 665, the receiver computes a checksum value CHK_IN', which is defined by:

$$\text{CHK\_IN'} = (\oplus_{i \notin J} P_i) \oplus S_m.$$

Note that the receiver can perform either step 660 or step 665 interchangeably, without regard to order. Moreover, the determination of the checksum values can be performed in parallel to the decryption of the received transmission blocks. A parallel implementation of the decryption and the verification steps would increase the speed at which the receiver can process the received transmission blocks.

At step 670, a value X is computed by encrypting CHK_IN' with key $K_1$, and the XORing the result with CHK_OUT'. This process is described mathematically as follows:

$$X = E_{K1}(\text{CHK\_IN'}) \oplus \text{CHK\_OUT'}.$$

At step 680, a comparison is made between X and $C'_m$. If X and $C'_m$ are equal, then the receiver can be sure of the integrity of the message. The inclusion of the values $C'_i$, $i \notin J$ in the checksum forms a difference between the HR mode of operation and the modes of operations proposed by Jutla and Rogaway.

Figure 7:
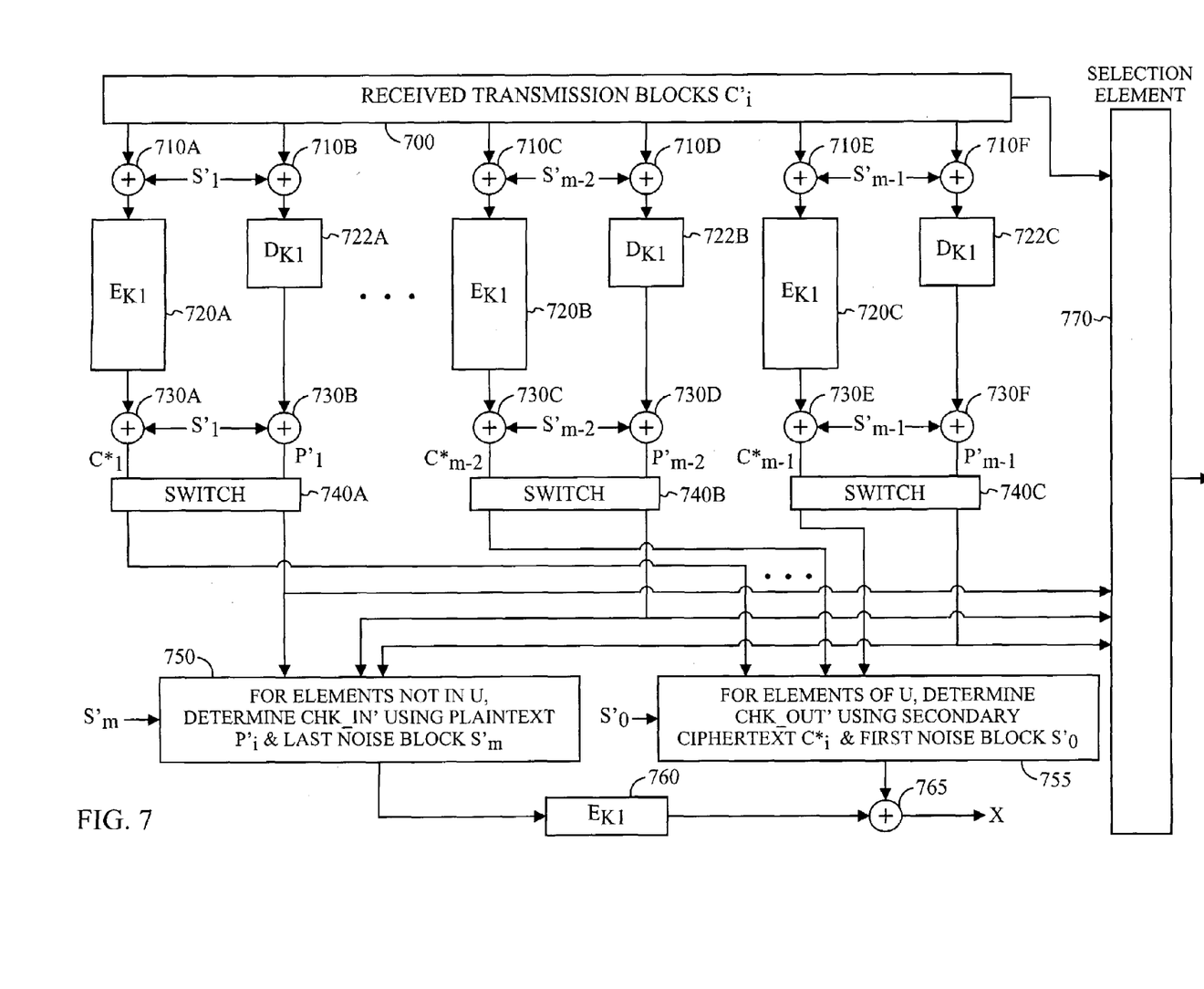
FIG. 7 is a block diagram of hardware configured to perform the decryption and verification for HR-IAPM.

FIG. 7 is a block diagram of hardware that is configured to perform the above decryption of the HR-IAPM mode in a parallel manner. It should be noted that FIG. 7 illustrates an implementation that can be an alternative to a software implementation, wherein a processor and memory is configured to execute a set of instructions for performing the above HR-IAPM decryption and verification process. Memory element 700 stores received ciphertext blocks $C'_i$. Encryption elements 720A, 720B, and 720C are configured to perform a cryptotgraphic function upon inputs. Decryption elements 722A, 722B, and 722C are configured to perform a decrypting function upon inputs. For illustrative purposes only, three (3) encryption elements and three (3) decryption elements are shown in FIG. 7 for encrypting received ciphertext blocks, but one of skill in the art knows that more or less encryption elements can be implemented without affecting the scope of the embodiment.

In this embodiment, the inputs to the encryption elements 720A, 720B, and 720C are the outputs of combining elements 710A, 710C, and 710E, respectively, and the inputs to the decryption elements 722A, 722B, and 722C are the outputs of combining elements 710B, 710D, and 710F, respectively. The inputs to the combining elements 710A, 710B, 710C, 710D, 710E and 710F are a received ciphertext block $C'_i$ and a corresponding noise block $S'_i$.

The outputs of encryption elements 720A, 720B, and 720C are each combined with a corresponding noise block at combining elements 730A, 730C, and 730E, respectively, to form secondary ciphertext blocks $C^*_i$. The outputs of decryption elements 722A, 722B, and 722C are combined with a corresponding noise block at combining elements 730B, 730D, and 730F, respectively, to form plaintext blocks P'$_i$. The outputs of the combining elements 730A and 730B are input into a switch 740A, wherein a control line (not shown) controls whether the output of the encryption element 720A or the output of the decryption element 722A is input into a processing element 750 or another processing element 755. For similar reasons, switches 740B and 740C are also implemented.

Processing block 750 is configured to determine a checksum value CHK_IN' by combining all plaintext blocks P'$_i$, for i∉J with the last noise block S'$_m$. Processing block 755 is configured to determine a checksum value CHK_OUT' by combining all secondary ciphertext blocks C*$_i$, for i∈U with the first noise block S'$_0$. The output of processing block 750 is then input into encryption element 760. The output of encryption element 760 and the output of processing element 765 is then combined by combining element 765 to form the value X.

The received transmission blocks C'$_i$ and the plaintext blocks P$_i$ are input into a selection element 770, which determines whether the blocks that were received were already in plaintext or in ciphertext. In other words, those C'$_i$ for which i∈U and those P'$_i$ for which i∉J are selected as the original data.

In the embodiments described above, block cipher encryption is used to compute the ciphertext and authentication tag. In alternate embodiments, block cipher decryption can be used in the place of some or all of the block cipher encryption operations performed by a sending party. Correspondingly, block cipher encryption would be used by a receiving party for the decryption and message integrity verification processes. Moreover, in an alternate embodiment, the set U can be defined as the set of ciphertext positions, rather than cleartext positions, and any implementation of such a set would require modifications that are within the scope of the embodiments herein.

In the HR-IAPM mode, the encryption and authentication functions are secure if the underlying block cipher is secure. There are formal expressions in the art for what is meant by the phrase "the encryption and authentication functions are secure," however these formal expressions are not relevant to the subject matter of the instant invention and will not be discussed in further detail herein.

Note that the sender can choose to send either P$_i$ or C$_i$, and the authentication is not compromised. The embodiments described herein allow a party to transmit both encrypted and unencrypted blocks without compromising the security of the authentication scheme. If P$_i$ is sent as plaintext, then the encrypted version of P$_i$ is still secret and unpredictable and can be used for secure authentication.

The authentication is also not compromised if only a portion of the final block is used as the MAC, rather than the entire final block. The embodiments described herein can be altered so that only a portion of the final block is transmitted as a MAC. A receiving party that performs the verification would be placed on notice, either by the message itself or as a predefined system parameter, that the MAC is a certain portion of the final block.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to-perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for encrypting and authenticating data as a single entity, comprising:
  arranging data into a plurality of plaintext blocks,
  determining a plurality of noise blocks using a nonce value and a first key;
  determining a plurality of ciphertext blocks by combining each of the plurality of plaintext blocks with a corresponding noise block to form an intermediate plaintext block, encrypting the intermediate plaintext block to form an intermediate ciphertext block, and combining the intermediate ciphertext block with the corresponding noise block to form a plurality of ciphertext blocks;

computing an input checksum value by combining the plurality of plaintext blocks that are not specified by at least one cleartext position and a noise block;

computing an output checksum value by combining the plurality of ciphertext blocks that are specified by the at least one cleartext position and another noise block;

computing an authentication tag by encrypting the input checksum value and combining the encrypted input checksum value with the output checksum value;

replacing each of the plurality of ciphertext blocks that is specified by the at least one cleartext position with a corresponding plaintext block; and appending the authentication tag.

2. The method of claim 1, wherein the nonce value is predetermined.

3. The method of claim 1, wherein the nonce value is negotiated between a sender and a receiver.

4. The method of claim 1, wherein the encrypting uses block cipher encryption.

5. The method of claim 1, wherein the encrypting comprises:

choosing to apply block cipher encryption or block cipher decryption;

selecting a block cipher to use, according to a set of predetermined selection rules; and forming the plurality of intermediate ciphertext blocks by applying the chosen block cipher encryption or block cipher decryption to one of the plurality of plaintext blocks combined with the corresponding noise block.

6. The method of claim 1, wherein combining is performed using a bit-wise exclusive-or operation.

7. The method of claim 1, wherein combining is performed using a group operator.

8. The method of claim 7, wherein the group operator is a modular integer addition operator.

9. A method for decrypting and verifying a plurality of received transmission blocks accompanied by an authentication tag, comprising:

determining a plurality of noise blocks using a nonce value;

for each of the plurality of received transmission blocks not specified by a cleartext position, determining a first plurality of plaintext blocks using a decryption mode;

for each of the plurality of received transmission blocks specified by a cleartext position, determining a plurality of secondary ciphertext blocks using an encryption mode;

determining a second plurality of plaintext blocks by setting each of the second plurality of plaintext blocks equal to a corresponding one of the plurality of received transmission blocks specified by a cleartext position;

computing an input checksum value based on the first plurality of plaintext blocks and a last noise block;

computing an output checksum value based on the plurality of second ciphertext blocks and a first noise block; and verifying the authentication tag using the input checksum value and the output checksum value.

10. The method of claim 9, wherein verifying the authentication tag comprises:

computing a test authentication tag by encrypting the input checksum value and combining the encrypted input checksum value with the output checksum value; and comparing the test authentication tag with the authentication tag, wherein the authentication tag is verified if the test authentication tag and authentication tag are the same.

11. The method of claim 9, wherein verifying the authentication tag comprises:

combining the authentication tag with the output checksum value to form a test input checksum value;

encrypting the input checksum value; and comparing the test input checksum value with the encrypted input checksum value, wherein the authentication tag is verified if the test input checksum value and the encrypted input checksum value are the same.

12. The method of claim 9, wherein verifying the authentication tag comprises:

combining the authentication tag with the output checksum value to form a test input checksum value;

decrypting the test input checksum value; and comparing the decrypted test input checksum value with the input checksum value, wherein the authentication tag is verified if the decrypted test input checksum value and the input checksum value are the same.

13. Apparatus for encrypting and authenticating data as a single entity, comprising:

at least one memory element; and at least one processing element configured to execute a set of instructions stored on the at least one memory element, the set of instructions for:

determining a plurality of noise blocks using a nonce value and a first key;

determining a plurality of ciphertext blocks by combining each of the plurality of plaintext blocks with a corresponding noise block to form an intermediate plaintext block, encrypting the intermediate plaintext block to form an intermediate ciphertext block, and combining the intermediate ciphertext block with the corresponding noise block to form a plurality of ciphertext blocks;

computing an input checksum value by combining the plurality of plaintext blocks that are not specified by at least one cleartext position and a noise block;

computing an output checksum value by combining the plurality of ciphertext blocks that are specified by the at least one cleartext position and another noise block;

computing an authentication tag by encrypting the input checksum value and combining the encrypted input checksum value with the output checksum value;

replacing each of the plurality of ciphertext blocks that is specified by the at least one cleartext position with a corresponding plaintext block; and appending the authentication tag.

14. Apparatus for decrypting and verifying a plurality of received transmission blocks accompanied by an authentication tag, comprising:

at least one memory element; and at least one processing element, the at least one processing element configured to execute a set of instructions store on the at least one memory element, the set of instructions for:

determining a plurality of noise blocks using a nonce value;

for each of the plurality of received transmission blocks not specified by a cleartext position, determining a first plurality of plaintext blocks using a decryption mode;

for each of the plurality of received transmission blocks specified by a cleartext position, determining a plurality of secondary ciphertext blocks using an encryption mode;

determining a second plurality of plaintext blocks by setting each of the second plurality of plaintext blocks equal to a corresponding one of the plurality of received transmission blocks specified by a cleartext position;

computing an input checksum value based on the first plurality of plaintext blocks and a noise block;

computing an output checksum value based on the plurality of second ciphertext blocks and another noise block; and verifying the authentication tag using the input checksum value and the output checksum value.

15. Apparatus for encrypting and authenticating data as a single entity, comprising:

means for determining a plurality of noise blocks using a nonce value and a first key;

means for determining a plurality of ciphertext blocks by combining each of the plurality of plaintext blocks with a corresponding noise block to form an intermediate plaintext block, encrypting the intermediate plaintext block to form an intermediate ciphertext block, and combining the intermediate ciphertext block with the corresponding noise clock to form a plurality of ciphertext blocks;

means for computing an input checksum value by combining the plurality of plaintext blocks that are not specified by at least one cleartext position and a noise block;

means for computing an output checksum value by combining the plurality of ciphertext blocks that are specified by the at least one cleartext position and another noise block;

means for computing an authentication tag by encrypting the input checksum value and combining the encrypted input checksum value with the output checksum value;

means for replacing each of the plurality of ciphertext blocks that is specified by the at least one cleartext position with a corresponding plaintext block; and means for appending the authentication tag.

16. Apparatus for decrypting and verifying a plurality of received transmission blocks accompanied by an authentication tag, comprising:

means for determining a plurality of noise blocks using a nonce value;

means for each of the plurality of received transmission blocks not specified by a cleartext position, determining a first plurality of plaintext blocks using a decryption mode;

means for each of the plurality of received transmission blocks specified by a cleartext position, determining a plurality of secondary ciphertext blocks using an encryption mode;

means for determining a second plurality of plaintext blocks by setting each of the second plurality of plaintext blocks equal to a corresponding one of the plurality of received transmission blocks specified by a cleartext position;

means for computing an input checksum value based on the first plurally of plaintext blocks and a noise block;

means for computing an output checksum value based on the plurality of second ciphertext blocks and another noise block; and means for verifying the authentication tag using the input checksum value and the output checksum value.

17. A method for secure data transmissions, wherein a first portion of the data transmission is sent as plaintext, a second portion of the data transmission is sent as ciphertext, and all of the data transmission is authenticated, the method comprising:

encrypting the first portion of the data transmission into a first ciphertext portion and the second portion of the data transmission into a second ciphertext portion, wherein the first portion of the data transmission is specified by a set of cleartext positions and the second portion of the data transmission is not associated with any one of the set of cleartext positions;

generating an input checksum value using the second portion of the data transmission and a noise block;

generating an output checksum value using the second ciphertext portion and another noise block;

forming an authentication tag from the input checksum value and the output checksum value; and transmitting the first portion of the data transmission, the second ciphertext portion, and the authentication tag.

18. Apparatus for secure data transmissions, wherein a first portion of the data transmission is sent as plaintext, a second portion of the data transmission is sent as ciphertext, and all of the data transmission is authenticated, the apparatus comprising:

means for encrypting the first portion of the data transmission a first ciphertext portion and the second portion of the data transmission into a second ciphertext portion, wherein the first portion of the data transmission is specified by a set of cleartext positions and the second portion of the data transmission is not associated with any one of the set of cleartext positions;

means for generating an input checksum value using the second portion of the data transmission and a noise block;

means for generating an output checksum value using the second ciphertext portion and another noise block;

means for forming an authentication tag from the input checksum value and the output checksum value; and means for selecting the first portion of the data transmission, the second ciphertext portion, and the authentication tag for transmission.

19. A machine readable medium having stored thereon instructions for encrypting and authenticating data as a single entity, the instructions including:

arranging data into a plurality of plaintext blocks, determining a plurality of noise blocks using a nonce value and a first key;

determining a plurality of ciphertext blocks by combining each of the plurality of plaintext blocks with a corresponding noise block to form an intermediate plaintext block, encrypting the intermediate plaintext block to form an intermediate ciphertext block, and combining the intermediate ciphertext block with the corresponding noise block to form a plurality of ciphertext blocks;

computing an input checksum value by combining the plurality of plaintext blocks that are not specified by at least one cleartext position and a noise block;

computing an output checksum value by combining the plurality of ciphertext blocks that are specified by the at least one cleartext position and another noise block;

computing an authentication tag by encrypting the input checksum value and combining the encrypted input checksum value with the output checksum value;

replacing each of the plurality of ciphertext blocks that is specified by the at least one cleartext position with a corresponding plaintext block; and appending the authentication tag.

20. The machine readable medium of claim 19, wherein the nonce value is predetermined.

21. The machine readable medium of claim 19, wherein the nonce value is negotiated between a sender and a receiver.

22. The machine readable medium of claim 19, wherein the encrypting uses block cipher encryption.

23. The machine readable medium of claim 19, wherein the encrypting comprises:
choosing to apply block cipher encryption or block cipher decryption;
selecting a block cipher to use, according to a set at predetermined selection rules; and
forming the plurality of intermediate ciphertext blocks by applying the chosen block cipher encryption or block cipher decryption to one of the plurality of plaintext blocks combined with the corresponding noise block.

24. The machine readable medium of claim 19, wherein combining is performed using a bit-wise exclusive-or operation.

25. The machine readable medium of claim 19, wherein combining is performed using a group operator.

26. The machine readable medium of claim 25, wherein the group operator is a modular integer addition operator.

27. A machine readable medium having stored thereon instructions for decrypting and verifying a plurality of received transmission blocks accompanied by an authentication tag, the instructions including:
determining a plurality of noise blocks using a nonce value;
for each of the plurality of received transmission blocks not specified by a cleartext position, determining a first plurality of plaintext blocks using a decryption mode;
for each of the plurality of received transmission blocks specified by a cleartext position, determining a plurality of secondary ciphertext blocks using an encryption mode;
determining a second plurality of plaintext blocks by setting each of the second plurality of plaintext blocks equal to a corresponding one of the plurality of received transmission blocks specified by a cleartext position;
computing an input checksum value based on the first plurality of plaintext blocks and the last noise block;
computing an output checksum value based on the plurality of second ciphertext blocks and the first noise block; and
verifying the authentication tag using the input checksum value and the output checksum value.

28. The machine readable medium of claim 27, wherein verifying the authentication tag comprises:
computing a test authentication tag by encrypting the input checksum value and combining the encrypted input checksum value with the output checksum value; and
comparing the test authentication tag with the authentication tag, wherein the authentication tag is verified if the test authentication tag and authentication tag are the same.

29. The machine readable medium of claim 27, wherein verifying the authentication tag comprises:
combining the authentication tag with the output checksum value to form a test input checksum value;

encrypting the input checksum value; and
comparing the test input checksum value with the encrypted input checksum value, wherein the authentication tag is verified if the test input checksum value and the encrypted input checksum value are the same.

30. The machine readable medium of claim 27, wherein verifying the authentication tag comprises:
combining the authentication tag with the output checksum value to form a test input checksum value;
decrypting the test input checksum value; and
comparing the decrypted test input checksum value with the input checksum value, wherein the authentication tag is verified if the decrypted test input checksum value and the input checksum value are the same.

31. An apparatus capable of encrypting and authenticating data as a single entity, the apparatus comprising:
a memory for storing data;
a processor connected to the memory and configured to:
arrange data into a plurality of plaintext blocks,
determine a plurality of noise blocks using a nonce value and a first key;
determine a plurality of ciphertext blocks by combining each of the plurality of plaintext blocks with a corresponding noise block to form an intermediate plaintext block, encrypting the intermediate plaintext block to form an intermediate ciphertext block, and combining the intermediate ciphertext block with the corresponding noise block to form a plurality of ciphertext blocks;
compute an input checksum value by combining the plurality of plaintext blocks that are not specified by at least one cleartext position and a nose block;
compute an output checksum value by combining the plurality of ciphertext blocks that are specified by the at least one cleartext position and another noise block;
compute an authentication tag by encrypting the input checksum value and combining the encrypted input checksum value with the output checksum value;
replace each of the plurality of ciphertext blocks that is specified by the at least one cleartext position with a corresponding plaintext block; and
append the authentication tag.

32. The apparatus of claim 31, wherein the nonce value is predetermined.

33. The apparatus of claim 31, wherein the nonce value is negotiated between a sender and a receiver.

34. The apparatus of claim 31, wherein the encrypting uses block cipher encryption.

35. The apparatus of claim 31, wherein the encrypting comprises:
choosing to apply block cipher encryption or block cipher decryption;
selecting a block cipher to use, according to a set of predetermined selection rules; and
forming the plurality of intermediate ciphertext blocks by applying the chosen block cipher encryption or block cipher decryption to one of the plurality of plaintext blocks combined with the corresponding noise block.

36. The apparatus of claim 31, wherein combining is performed using a bit-wise exclusive-or operation.

37. The apparatus of claim 31, wherein combining is performed using a group operator.

38. The apparatus of claim 31, wherein the group operator is a modular integer addition operator.

39. An apparatus capable of decrypting and verifying a plurality of received transmission blocks accompanied by an authentication tag, the apparatus comprising:

a memory for storing data;
a processor connected to the memory and configured to:
   determine a plurality of noise blocks using a nonce value;
   for each of the plurality of received transmission blocks not specified by a cleartext position, determine a first plurality of plaintext blocks using a decryption mode;
   for each of the plurality of received transmission blocks specified by a cleartext position, determine a plurality of secondary ciphertext blocks using an encryption mode;
   determine a second plurality of plaintext blocks by setting each of the second plurality of plaintext blocks equal to a corresponding one of the plurality of received transmission blocks specified by a cleartext position;
   compute an input checksum value based on the first plurality of plaintext blocks and the last noise block;
   compute an output checksum value based on the plurality of second ciphertext blocks and the first noise block; and
   verify the authentication tag using the input checksum value and the output checksum value.

40. The apparatus of claim 39, wherein verifying the authentication tag comprises:

computing a test authentication tag by encrypting the input checksum value and combining the encrypted input checksum value with the output checksum value; and comparing the test authentication tag with the authentication tag, wherein the authentication tag is verified if the test authentication tag and authentication tag are the same.

41. The apparatus of claim 39, wherein verifying the authentication tag comprises:

combining the authentication tag with the output checksum value to form a test input checksum value;
encrypting the input checksum value; and
comparing the test input checksum value with the encrypted input checksum value, wherein the authentication tag is verified if the test input checksum value and the encrypted input checksum value are the same.

42. The apparatus of claim 39, wherein verifying the authentication tag comprises:

combining the authentication tag with the output checksum value to form a test input checksum value;
decrypting the test input checksum value; and
comparing the decrypted test input checksum value with the input checksum value, wherein the authentication tag is verified if the decrypted test input checksum value and the input checksum value are the same.

* * * * *